Feb. 24, 1942.   L. E. WILLARD   2,274,227
SHOCK ABSORBING SYSTEM
Filed Sept. 17, 1940
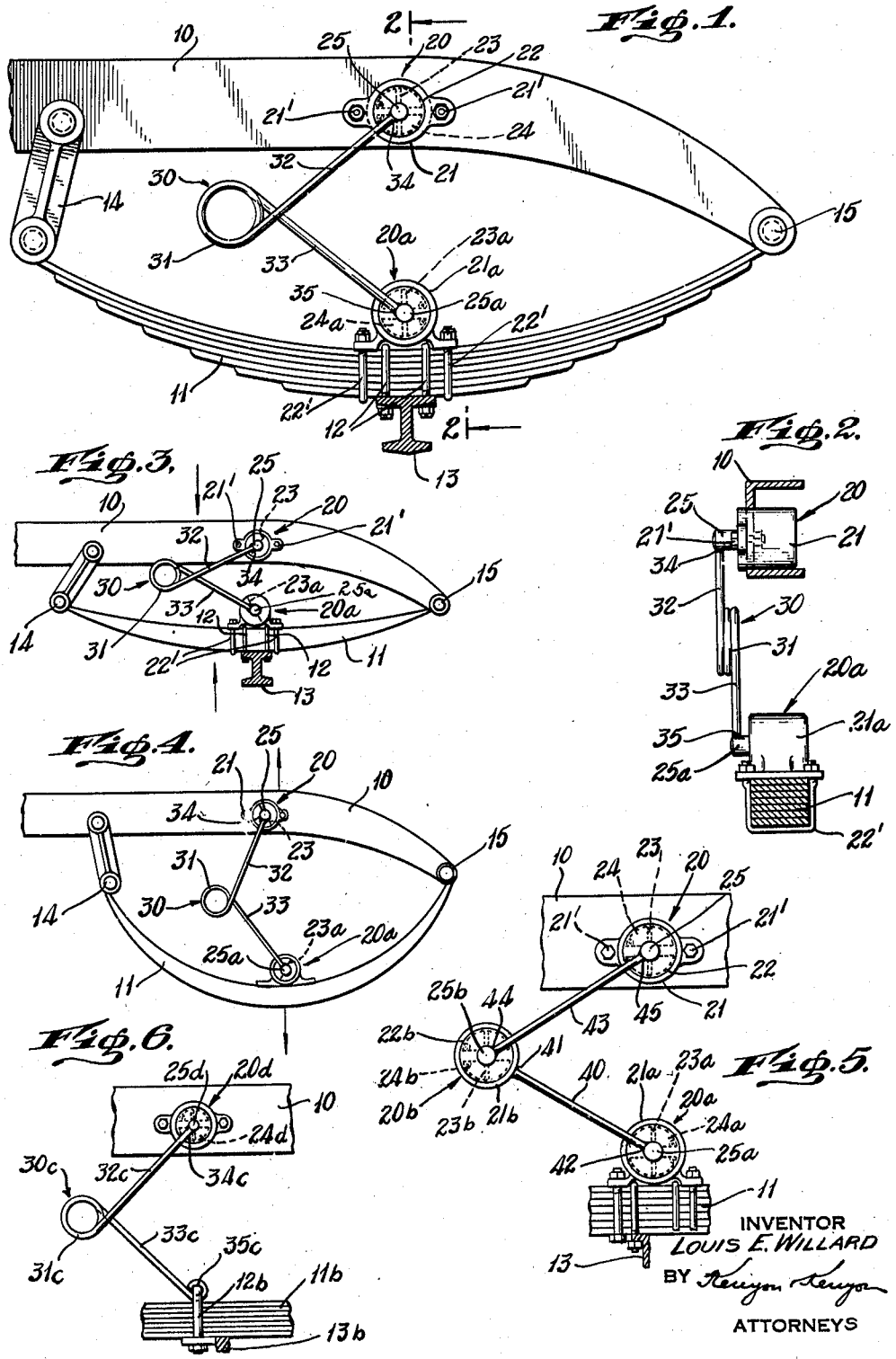
INVENTOR
LOUIS E. WILLARD
BY Kenyon Kenyon
ATTORNEYS Patented Feb. 24, 1942

2,274,227

UNITED STATES PATENT OFFICE 2,274,227

SHOCK ABSORBING SYSTEM

Louis E. Willard, Long Island City, N. Y., assignor to Charles Zimmer, Brooklyn, N. Y.

Application September 17, 1940, Serial No. 357,079

3 Claims. (Cl. 267—8)

The present invention relates to shock absorbing systems adapted for use particularly in conjunction with suspension springs, chassis or frames and axles of automobiles, wagons and other vehicles, and also may be used for door checks and the like.

In many shock absorber systems in use today, utilizing a shock absorber of the type in which a liquid is forced from one place to another by a piston, the liquid serves as the resisting medium for cushioning the shock. These systems generally have such a shock absorber mounted on the longitudinal side bars of the main frame or chassis near each wheel. The shock absorber is what is known generally as a wing or vane type and is provided with an outwardly extending portion of its piston. The vanes or wings which function in the operating chamber of the shock absorber housing are secured to a portion of the piston in the chamber and oscillate with it. An operating lever or crank arm is rigidly fixed or formed on the outwardly extending portion of the piston. This lever is connected through linkages and articulated linkage joints to the axle of the wheel with which the shock absorber is designed to function.

Systems embodying this construction have many disadvantages. They are noisy in operation because of the articulated joints and subject to criticisms and rejection by the vehicle user for this reason alone. They are costly because of the number of parts necessary for installation, and because of the time and labor involved in their installation and/or replacement. Being connected by articulated joints and linkages these systems are extremely subject to failure at critical times. Each articulated joint requires frequent lubrication or rubber cushions and on modern vehicles a connection to the lubricating system with the resultant increased cost of production of the vehicle.

It is an object of this invention to provide a shock absorber system in which the shock absorber lever or crank arms, linkages and articulated linkage joints are entirely eliminated and in which a jointless positive drive for the pistons of the shock absorbers in the system is effected.

It is also an object of this invention to provide a shock absorber system free of articulated joints utilizing a helper spring in conjunction with the main spring of the vehicle. This helper spring serves as a positive drive for the shock absorber piston, replacing the shock absorber arm and usual link and articulated joint. It also serves as an auxiliary spring to compensate for loss of efficiency of the main spring resulting from use and wear of the latter.

It is a further object of this invention to provide a novel shock absorber system which is noiseless in operation, simple in construction, comparatively cheap in cost, easy to install and easy to replace or repair.

It is a further object to provide a shock absorber system which will operate properly under all weather conditions, i. e., be capable of all weather performance.

To the accomplishment of the foregoing and such other objects as may hereinafter appear, this invention consists in the novel construction and arrangement of parts hereinafter described and then sought to be defined in the appended claims, reference being had to the accompanying drawing forming a part hereof and which show, merely for the purposes of illustrative disclosure, preferred embodiments of the invention, it being expressly understood, however, that various changes may be made in practice within the scope of the claims without digressing from the inventive idea.

In the accompanying drawing, in which similar reference characters denote corresponding parts:

Fig. 1 is a side elevation, partly in section, of a portion of the chassis or frame, the axle and a suspension spring for one wheel of an automobile equipped with my improved shock absorber system showing the system in its neutral or normal position.

Fig. 2 is a vertical cross section taken along line 2—2 of Fig. 1 and viewed in the direction of the arrows.

Fig. 3 is a view similar to Fig. 1 on a smaller scale showing the position of parts of the system after the axle has been subjected to shock, i. e., on the upthrow of the axle.

Fig. 4 is a view similar to Fig. 1 also on a reduced scale showing the position of parts of the system on recoil of the suspension spring, i. e., on the downthrow of the axle.

Fig. 5 is a view similar to Fig. 1 illustrating a modified form of shock absorbing system, and Fig. 6 is a view similar to Fig. 1 illustrating a further modified form of shock absorbing system utilizing the principles of my invention.

Referring to the drawing, 10 designates a longitudinal side bar of a main frame or chassis which may be a portion of an automobile chassis or other vehicle chassis. 11 is a suspension spring having its central part secured in usual manner as by shackle or U-bolts 12 or in other suitable way to the support or axle 13. The ends of the spring are connected suitably at 14 and 15 to the side bar 10 to sustain the load carried by said side bar.

A shock absorber denoted generally by the reference numeral 20 is suitably supported at 21' from the side bar 10, and a second similar type of shock absorber 20a is supported by the shackle or U-bolts 22' or in other suitable manner from the spring 11 in the region directly above the axle 13. This second shock absorber 20a may be supported directly from the axle 13 if desired. Inasmuch as there is rigid connection between the spring 11 and axle 13 through the agency of shackle or U-bolts 12, the shock absorber 20a is in effect supported by the axle 13.

Both shock absorbers 20 and 20a, in the embodiment shown, are of the wing or vane type well known in the art and exemplified, for example, by those described and shown in my own previous patents numbered 2,149,129 issued February 28, 1939, and 2,158,645 issued May 16, 1939. Briefly a shock absorber of this type comprises an outer casing 21 which is provided with suitable means for securing the same to a part of the vehicle. The casing is provided with a working chamber 22 in which the vanes, blades or wings 23 of an oscillatable piston 24 operate. The piston may have an operating portion 25 which extends externally of the casing and which may be suitably rotated to effect functioning of the shock absorber. In well known manner, as for example that described in my Patent No. 2,158,645, means (not shown) are provided internally of the casing for supplying fluid through suitable valving (also not shown) to the working chamber 22 to cause the well known operation of this type of shock absorber. It is to be understood that any other suitable wing, cam-actuated cylinder or vane type fluid-containing shock absorber having an externally extending operating piston portion or shaft may be used.

In the embodiment shown, the operating portion 25 of the piston of the chassis of frame mounted shock absorber 20 is directly interconnected with the operating portion 25a of the piston of the axle mounted or supported shock absorber 20a by a connection which is free of articulated joints. To this end, a helper or auxiliary spring 30 is provided. This spring may be a spiral coil spring having a few turns 31. The number of turns, strength of the spring, its material and other physical characteristics are all dependent upon the size and weight of the vehicle with which it is to be used. Two integrally formed rigid arms or extensions 32 and 33 are provided, one at each end of the spring 30. These arms extend laterally in angular relationship from the coil surface, being spaced apart by the number of turns of the coil and crossing each other in scissor-fashion as shown in Figs. 1 and 2. The relative length and angular disposition of the arms is such that when they are joined to the pistons 25 and 25a in the manner hereinafter to be described, the center of rotation of the pistons 25 and 25a and the center of the coil in the neutral position of parts are located approximately at the apices of a triangle. In the embodiment shown this triangle is equi-lateral. Other triangles are contemplated.

In the embodiment shown, arm 32 has its end fixed as by welding at 34 to the operating portion 25 of the piston of the frame supported shock absorber 20. In similar manner, arm 33 has its end fixed as by welding at 35 to the operating portion 25a of the piston of the shock absorber 20a. Other suitable means for fixedly attaching the arms to the operating portion 25, 25a of the pistons may be employed. In practice welding is the simplest and eliminates extra parts.

The coil portion of the spring is suspended in the space between the side bar 10 and the main suspension spring 11 being supported there solely by the connection of its rigid arms 32 and 33 with the piston extensions 25 and 25a of the two shock absorbers 20 and 20a.

This system operates generally as follows: On the upthrow of the axle 13 caused by a vehicle passing over a bump, the suspension spring 11 moves upwardly too. This upward movement because of the rigid connection of the rigid arms 32 and 33 to the piston extensions 25 and 25a causes torsion of the spring 30. The reaction of spring 30 to the torsional force imparted to it in turn through the arms 32 and 33 causes rotation of the piston extensions 25, 25a of the two shock absorbers 20 and 20a and consequently rotates the vanes or wings 23, 23a of the shock absorbers from their neutral positions shown in Fig. 1 to positions illustrated diagrammatically in Fig. 3. During such movement the well known retarding functioning of the shock absorbers 20 and 20a occurs, so that the shock imparted to the axle is not transmitted to the chassis or frame side bar 10.

The rebound of the suspension spring 11, and downthrow of the axle 13 as illustrated in Fig. 4 on an exaggerated scale, causes torsion of the spring 30 in the opposite direction to that of the upthrow just described and consequently causes rotation of the vanes or wings 23, 23a in opposite direction to the positions shown diagrammaticly in said Fig. 4. During such rotational movement, of course, the shock absorbers 20, 20a function in their well known retarding manner so that the rebound of the suspension spring 11 is not felt in the chassis frame.

At all times as well as during both upthrow and downthrow of the axle 13, the spring 30 also acts as a ride suspension helper spring for the main suspension spring 11. This helping action is more marked and effective when the efficiency of the main suspension spring has deteriorated after long use.

It is to be understood that the strength of spring 30, and the length of the rigid arms 32 and 33 thereof are the determining factors in the extent of rotation of the wings or vanes of the two shock absorbers and that the spring 30 used must be such as to give the required action for any particular vehicle. In practice, for example, the spring 30 used in a shock absorbing system for a heavy vehicle must be of heavier construction than one for a light car. These factors are well understood by men skilled in the art.

A modified form of shock absorbing system embodying principles of my invention is shown in Fig. 5. In this system the helper spring has been eliminated. The two shock absorbers 20 and 20a are interconnected through the agency of a third shock absorber 20b. This shock absorber 20b is preferably of the same type as shock absorbers 20 and 20a and has parts corresponding thereto similarly numbered and bearing the subscript b. Its casing 21b has a rigid arm 40 welded or otherwise permanently fixed to it at 41. The opposite end of this arm 40 is welded or otherwise permanently fixed at 42 to the extending portion 25a of the piston of the axle supported shock absorber 20a. The extending portion 25b of the piston of the shock absorber 20b has a rigid arm 43 welded or otherwise suitably secured to it at 44. The opposite end of arm 43 is welded to or otherwise suitably fixed at 45 to the extending portion 25 of the piston of the frame supported shock absorber 20. Arms 40 and 43 are so proportioned in length that preferably in the neutral position of all parts as shown in Fig. 5, the centers of oscillation of the extending portions 25, 25a, 25b of the pistons 24, 24a, 24b are located substantially at the apices of an equi-lateral triangle. Other angular arrangements are, however, contemplated. The shock absorber 20b is suspended in the space between the side bar 10 and the main suspension spring 11, being supported there solely by the coupling arms or bars 40 and 43.

In operation of this system, shock imparted to the axle 13 will cause positive drive of the pistons of all three shock absorbers through the agency of the rigid arms 40 and 43, resulting in a very smooth riding vehicle. Since all the shock absorbers are entirely noiseless in operation and since no swivel joints are used for interconnection, all noise is entirely eliminated in the action of this shock absorbing system. The entire system may be quickly replaced after wear if necessary, or individual shock absorbers, or parts thereof, replaced simply and quickly should repair become necessary.

It is to be noted that this system may be modified if desired to include the helper spring system of Figs. 1–4 inclusive simply by the substitution for either or both arms 40 and 43 of helper springs similar to the helper spring 30 of Fig. 1.

A further modified form of my invention is shown in Fig. 6 wherein only one shock absorber is used. In this form, the single shock absorber 20d is suitably supported from the side piece 10 of the frame and the arm 32c of helper spring 30c welded or otherwise suitably attached at 34c to the piston extension 25d. The free end of the other arm 33c of the helper spring is jointed or otherwise suitably attached at 35c to the shackle or U-bolt 12b, which attaches the suspension spring 11b to the axle 13b. The arm 33c may be directly jointed or otherwise suitably attached to the axle 11b or to any other part conveniently and rigidly associated with the axle. The spring 30c functions both as an auxiliary or helper to the suspension spring 11b and as a direct one joint coupling member between the axle 13b and the extending portion 25d of the shock absorber piston 24d.

In two of the systems above described, all articulated linkage joints have been eliminated and essentially noiseless operation of the shock absorbing system achieved.

For convenience, the chassis or frame 10 and parts carried on it may be referred to as the sprung parts of the vehicle and the axle 13 may be referred to as the unsprung part of the vehicle.

In the systems embodying helper springs 30, 30a or 30b and 30c, an additional advantage has been introduced by the utilization of such springs. These helper springs introduce a counteracting frequency into the system which tends to destroy the natural period of resonance of the main suspension springs. This tendency is of marked advantage and effective particularly when the main suspension springs have begun to lose their efficiency through use and wear of the vehicle. If, for example, one of the systems herein disclosed embodying helper springs is installed in an older car the counteracting frequencies of the new helper spring or springs will tend to destroy the natural resonance of the old main suspension spring or springs and eliminate sources of unwanted vibration.

All the systems herein disclosed in effect provide a knee-action ride for front and rear of any vehicle.

While specific types of wing or vane type shock absorbers have been described, it is to be understood that other types of suitable shock absorbers may be incorporated in the systems.

Other modifications embodying the principles of this invention are contemplated. There is no intention of limitation to the exact details shown and described.

I claim:

1. In combination, a vehicle chassis or frame, an axle, a chassis supported shock absorber, an axle supported shock absorber, and means for directly coupling said two shock absorbers in operative relationship, said coupling means comprising a spring having portions thereof directly and rigidly connected to each shock absorber and said spring being suspended solely by said connected portions thereof, and constituting with its arms a positive drive connection between the pistons of said shock absorbers which is free of articulation at all connections between arms and shock absorber portions, and serving both as a helper suspension spring between said chassis or frame and said axle and as a retarder of the transmission of motion from said axle to said shock absorbers.

2. In combination, an unsprung part of a vehicle, a sprung part of said vehicle supported from said unsprung part, spring suspension means carried by said unsprung part and connected to said sprung part for supporting said sprung part from said unsprung part, a shock absorber attached to said sprung part and having an operating member extending therefrom, a second shock absorber carried by said unsprung part and having an operating member extending therefrom, a coiled auxiliary spring having crossed integral arms extending therefrom, each of said arms being welded directly to one of said operating members whereby the connection between said shock absorbers and said auxiliary spring is free of all articulated joints and the system of shock absorbers and coil spring is noiseless in operation, the said auxiliary spring lying between said sprung and unsprung parts and serving both as a helper spring for said spring suspension means and as a retarder in the transmission of motion of the unsprung part to the said two shock absorbers.

3. In combination, an unsprung part of a vehicle, a sprung part of said vehicle supported from said unsprung part, spring suspension means carried by said unsprung part and connected to said sprung part for supporting the latter from said unsprung part, a shock absorber rigidly attached to said sprung part and having an oscillating piston and an operating member attached to said piston and extending outwardly of said absorber, a second shock absorber rigidly connected with said unsprung part also having an oscillating piston and an operating member attached to its piston, a coiled auxiliary spring having integral crossed arms extending from its ends, each of said arms being directly welded to one of said operating members so that said auxiliary spring lies between said sprung and unsprung parts and whereby the interconnection of said shock absorbers and said auxiliary spring is free of all articulated joints and the system of shock absorbers and coil spring is noiseless in operation, the said coil spring serving as a helper spring for said spring suspension means and as a retarder of the transmission of motion of the unsprung part to the said pistons of said shock absorbers.

LOUIS E. WILLARD.